United States Patent [19]

Bilhorn

[11] 4,328,297

[45] May 4, 1982

[54] ELECTRODE

[75] Inventor: John M. Bilhorn, Stonington, Conn.

[73] Assignee: Yardngy Electric Corporation, Pawcatuck, Conn.

[21] Appl. No.: 248,078

[22] Filed: Mar. 27, 1981

[51] Int. Cl.³ .............................................. H01M 4/36
[52] U.S. Cl. .................................. 429/222; 429/229; 429/245
[58] Field of Search ....................... 429/222, 229-231, 429/245, 241

[56] References Cited

U.S. PATENT DOCUMENTS 3,982,960 9/1976 Hoekje ............................ 429/229 X Primary Examiner—Charles F. Lefevour
Attorney, Agent, or Firm—Donald E. Nist

[57] ABSTRACT

An improved electrode useful in electrochemical cells utilizes as the electrochemically active material zinc, zinc oxide, cadmium, cadmium oxide or a mixture of two or more of these materials. This electrochemically active material is preferably in the form of a shape-retaining body and is in direct contact with a novel current collector resistant to corrosion in strong alkaline electrolytes. The current collector is an alloy having at least about 40% of bismuth and at least about 25% of lead, by weight of the alloy. In one preferred embodiment the alloy consists entirely or essentially of bismuth and lead. In another embodiment, the alloy also includes at least one of the metals cadmium and tin. A useful collector can be formed by casting an alloy having about 50% bismuth, 27% lead, 13% tin and 10% cadmium, by weight of the alloy. When the alloy consists essentially of bismuth and lead, for example, 50-60% bismuth by weight of the alloy, the alloy can be rolled into a thin sheet which can be subsequently slit, perforated or the like and used as the current collector. The improved electrode exhibits improved resistance to cell capacity degradation upon successive cycling of the cell. The electrode is simple, inexpensive, effective and durable.

11 Claims, 2 Drawing Figures

ELECTRODE

BACKGROUND OF THE INVENTION

1. Field of the Invention

The present invention generally relates to electrodes and more particularly to an improved electrode for use in an alkaline electrolyte-containing cell, which electrode contains a novel current collector.

2. Prior Art

In electrochemically generating energy, usually means are provided for collecting the current in the electrode and for transmitting it to an external tab or terminal. It has been conventional to use relatively expensive inert metallic materials as current collectors in rechargeable cells designed for long life. For example, silver grids are generally used in zinc/zinc oxide electrodes in such cells.

In some instances, costs have been cut by plating noble metals or other chemically inert metals of relatively high cost on high conductivity metal cores which are not chemically inert. For example, silver can be plates on copper current collectors. The more uniform and thick the silver plating layer, the more closely such a current collector approaches the performance and longevity of pure silver current collectors. However, the thicker the silver coating, the higher the ultimate cost of the current collector. One such procedure involves plating or cladding a strip of copper with a noble metal and then forming the clad sheet into a current collecter by slitting, perforating or shearing it to open it up and increase its surface area. These forming operations, however, expose raw copper edges which decrease the performance and longevity of the current collector. Plating of copper pieces with noble metals after the pieces have been cut, slit, perforated, sheared or the like is a more costly procedure but provides a better current collector. Nevertheless, there still is need for an improved type of current collector which will exhibit high performance characteristics and great longevity and which can be fabricated rapidly at low cost.

SUMMARY OF THE INVENTION

The foregoing needs have been satisfied by the improved electrode of the present invention which incorporates a novel current collector of low cost, great longevity and improved performance. The electrode is substantially as set forth in the Abstract above. Thus, it comprises a mass or body of electrochemically active material, preferably in a self-supporting configuration such as a sintered plaque or the like, which material is selected from the group consisting of zinc, zinc oxide, cadmium, cadmium oxide and mixtures thereof.

The electrode employs a novel current collector which is an alloy which is resistant to chemical and electrochemical attack in strong alkaline electrolytes. The alloy comprises at least about 40% of bismuth and at least about 25% of lead, by weight of the alloy. Minor proportions of tin and/or cadmium may be present. Preferably, the bismuth is in the concentration of at least about 50% by weight of the alloy and lead is preferably present in a sufficient concentration to enable the alloy to be easily rolled to a thin sheet which then can be perforated by slitting, cutting, shearing, stamping or the like to form the finished current collector. Rollable alloys usually contain at least about 40% by weight of lead. The current collector is inexpensive and durable, uniform in composition and characteristics throughout.

The electrode containing the current collector exhibits high performance characteristics over a long period of use.

Various other features of the present invention are set forth in the following detailed description and the accompanying drawings.

DRAWINGS

FIG. 1 is a schematic front elevation, partly broken away, of a preferred embodiment of the improved electrode of the invention containing the novel current collector; and, FIG. 2 is a graph depicting the capacity decline for electrodes in nickel zinc cells, which electrodes incorporate various current collectors including in one instance the novel current collector of the present invention.

DETAILED DESCRIPTION

Figure 1:
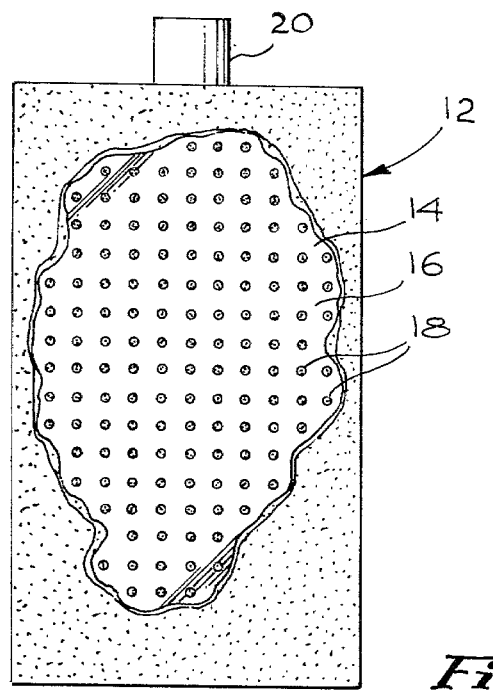

Now referring more particularly to FIG. 1 of the accompanying drawings, a preferred embodiment of the improved electrode of the present invention is schematically shown. The electrode is particularly suitable for use in cells which include strong alkaline electrolytes. The electrode 10 comprises a self-supporting body or mass 12 of suitable configuration such as a rectangular plate, which body is mainly comprised of electrochemically active material selected from the group consisting of zinc, zinc oxide, cadmium, cadmium oxide and mixtures thereof. Normally, zinc and zinc oxide will be present together and in other instances cadmium and cadmium oxide. Body 12 may be in the form of a sintered plaque fabricated in accordance with any suitable conventional procedure and having wholly disposed therein or applied to one side thereof a novel current collector 14, preferably in the form of a perforated or expanded metal sheet 16 as shown in FIG. 1. The perforations 18 in sheet 16 are filled with the electrochemically active material comprising body 12.

Current collector 14 consists essentially of an alloy which is chemically resistant to strong alkaline electrolytes and also electrochemically resistant to the environments in alkaline batteries and cells. The alloy consists essentially of at least about 40% of bismuth and at least about 25% of lead, by weight of the alloy. The remaining constituents of the alloy, if any, are tin and/or cadmium in a total amount of less than about 25% by weight of the alloy. Preferably, lead is present in a concentration of at least about 40%, by weight of the alloy, in order to assure that the alloy can be easily formed into the current collector, as by rolling it to a thin sheet of for example about 0.01" thickness or less. Bismuth is present preferably in an amount of at least about 50% by weight of the alloy and its preferred range is about 55–60% by weight of the alloy. A rollable alloy particularly useful in forming the current collector consists of about 58% of bismuth with the remainder lead, by weight of the alloy. A second typical alloy which, however, cannot be rolled but must be cast to form the current collector comprises 50% bismuth, about 27% lead, about 13% tin and about 10% cadmium, by weight of the alloy.

It will be understood that the current collector sheet 16 can be in any suitable configuration and that the perforations 18 can be formed therein during casting or by slitting, punching, drilling, stamping or other operation. The size of the apertures or perforations 18 and their number and spacing will vary as desired. As a typical example, a current collector sheet of the dimensions 1.75" by 3.0" has a total number of 499 openings therein space in a staggered pattern, each opening being about 0.077" in size and spaced from each other opening by about 0.032". A current collector tab 20 is connected through body 12 and is in direct contact with collector 14 but extends outwardly of body 12 for connection with other suitable components in an electrochemical cell.

Electrode 10 is particularly useful as a zinc or cadmium electrode in a nickel-zinc or nickel-cadmium cell or in a silver-zinc or silver cadmium cell employing an alkaline electrolyte such as sodium hydroxide or potassium hydroxide.

Although bismuth is known for use in connection with certain zinc cell systems, for example, as indicated in U.S. Pat. No. 4,037,033, that patent indicates the use of either bismuth or cadmium in the oxide form in a concentration of 1-20% only as an additive to increase the conductivity of the electrode. Lead has been introduced in oxide form in small percentages as an additive to zinc oxide and as a replacement for mercuric oxide in the suppressing of gas. However, so far as is known, current collectors of the composition set forth herein have not been utilized in connection with cadmium or zinc electrodes.

The following specific example further illustrates the features of the present invention.

EXAMPLE

An alloy containing 58% by weight of bismuth and 42% of lead was made up and rolled to less than 0.010" thickness, then perforated to form apertures having the following dimensions, numbers and spacings: 0.077" diameter, 95 holes per square inch, staggered pattern, 46% open area. The strip thus formed was cut to the following dimensions: 1.75"×3.0". That strip, with a silver terminal or tab attached thereto was encapsulated in a zinc oxide electrode having the following composition and frabricated by the following procedures: 88% zinc oxide, 8% metallic zinc power, 2% cadmium oxide, 1% lead oxide, 1% carboxymethyl cellulose as a binder, fabricated by roll bonding according to the procedure of U.S. Pat. No. 4,197,635.

A second current collector was formed utilizing an alloy containing 50% bismuth, 26.7% lead, 13.3% tin and 10% cadmium. The alloy was cast into a form to provide the following finished dimensions: 1.75"×3.0".

The alloy sheet was then perforated to provide apertures having the following dimensions, numbers and spacing: 0.077" diameter, 95 holes per square inch, staggered pattern, 46% open area, The finished current collector had a terminal or tab of silver attached to it and then was encapsulated in zinc oxide of the same composition and by the same roll bonding process as described above for the bismuth-lead alloy collector-containing electrode.

A silver current collector of pure silver grid material having the following dimensions and aperture array was utilized as a control: 1.75"×3.0", 0.077" diameter holes, 95holes per square inch, staggered pattern, 46% open area. This silver grid was incorporated into zinc oxide during the formation of a zinc oxide electrode by the same roll bonding process described above. The silver grid had a silver tab attached to it.

Another current collector was prepared by utilizing a copper grid. After formation of the grid, it was electroplated with 100 microns in thickness of pure silver. The grid had the following dimensions and size and number and spacing of apertures:1.75"×3.0", 0.077" diameter holes, 95 holes per square inch, staggered pattern, 46% open area.

This grid was encapsulated into a zinc oxide electrode of the same composition as called for above by the same roll bonding process.

The four electrodes thus formed were identical except for their current collectors. Each electrode was then tested to determine its performance characteristics by placing it within an electrochemical cell having the following other electrodes, electrolyte, capacity and dimensions: sintered plate electrochemically impregnated nickel oxide positives, 40% KOH with 1% LiOH electrolyte, 4.75 ampere hour negative limiting capacity, 0.435" inside thickness. A measure of the detrimental effect of the current collector on cell performance is the rate at which the zinc oxide electrode capacity degrades upon successive cycling of the cell. This is expressed as a ratio of ampere hours output per ampere hour input. In the test performed the capacity decline for the 5 ampere hours negative limited nickel zinc cells was determined as cycling continued. The results are set forth in Table I below:

TABLE I

| Grid Material | Cycle 4 AHo/AHi | Cycle 8 AHo/AHi | Cycle 12 AHo/AHi | Cycle 16 AHo/AHi |
|---|---|---|---|---|
| Ag | 68% | 56.3 | 48.5 | 39.9 |
| Ag plated Cu | 60.6% | 49.5 | 42.5 | 33.6 |
| Bi/Pb/Cd/Sn Alloy | 47.5% | 50.8 | 43.1 | 35.6 |
| Bi/Pb Alloy | 68.5% | 61.8 | 50.2 | 42.2 |

Figure 2:
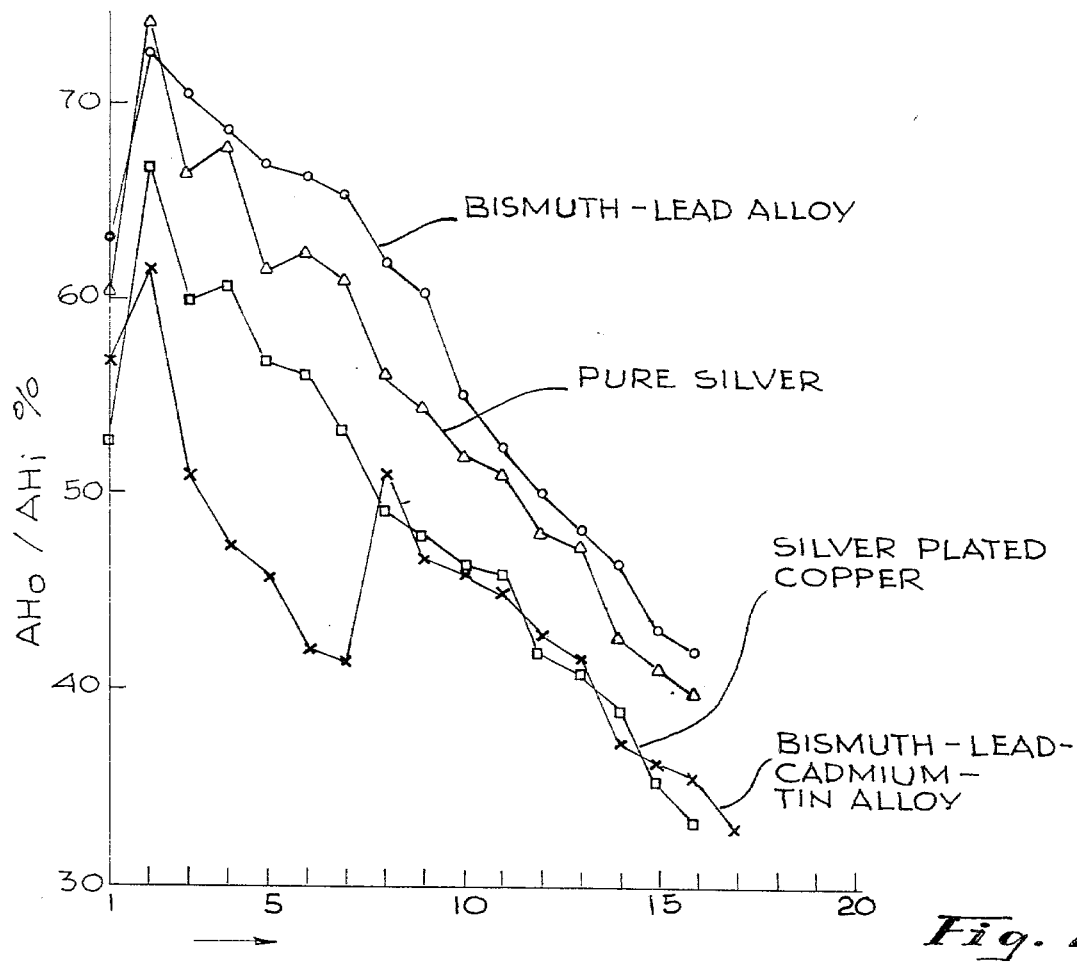

The results of the tests are also shown in the graph which is set forth as FIG. 2 in the accompanying drawings. As can be seen from Table I and the graph, superior results are obtained with both the silver current collector and the current collector which has only bismuth and lead in it. Satisfactory but less desirable results are obtained with electrodes having current collectors consisting of silver electroplated copper or the alloy which contains in addition to bismuth and lead, cadmium and tin. It will be understood that the alloys which are employed in the electrode of the present invention are far less expensive than pure silver or silver coated by an expensive procedure on copper or other electrically conductive chemically active metal.

In parallel tests it has been shown that bismuth-lead alloy-containing current collector performs equally satisfactorily in cadmium and cadmium oxide electrodes. It has also been shown that the bismuth lead-cadmium-tin alloy when utilized as a current collector for cadmium and cadmium oxide electrodes performs comparably to its performance when the chemically active material is zinc or zinc oxide.

Accordingly, the improved results obtained with the novel electrode and collector of the present invention have been demonstrated. Various changes, modifications, alterations and additions can be made in the improved electrode of the present invention, its components and their parameters. All such changes, modifications, alterations and additions as are within the scope of the appended claims form part of the present invention.

What is claimed is:

1. An improved electrode for an electrochemical cell, said electrode comprising, in combination:

a. a body comprising electrochemically active material selected from the group consisting of zinc, zinc oxide, cadmium, cadmium oxide and mixtures thereof; and, b. a current collector in contact with said body, said current collector being an alloy having at least about 40 percent, by weight of said alloy, of bismuth, and at least about 25 percent, by weight of said alloy, of lead.

2. The improved electrode of claim 1 wherein said alloy consists essentially of bismuth and lead.

3. The improved electrode of claim 2 wherein said bismuth is present in the concentration of about 50–60 percent, by weight of said alloy.

4. The improved electrode of claim 1 wherein said alloy includes at least one of tin and cadmium in a total amount for said cadmium and tin of less than about 25 percent by weight of said alloy.

5. The improved electrode of claim 4 wherein said alloy includes tin.

6. The improved electrode of claim 4 wherein said alloy includes cadmium.

7. The improved electrode of claim 1 wherein said alloy includes at least about 40 percent of lead, by weight of said alloy, and is rollable.

8. The improved electrode of claim 4 wherein said alloy consists essentially of about 50 percent bismuth, 27 percent lead, 13 percent tin and 10 percent cadmium, by weight of said alloy.

9. The improved electrode of claim 3 wherein said collector is in the form of a rolled perforated sheet less than about 0.01" in thickness.

10. The improved electrode of claim 8 wherein said collector is in the form of a cast grid.

11. The improved electrode of claim 3 wherein said alloy consists essentially of about 58 percent bismuth and 42 percent of lead, by weight of said alloy.

* * * * *